No. 646,550. Patented Apr. 3, 1900.
J. S. DETWILER.
CLEANING, SCOURING, AND POLISHING MACHINE FOR GRAIN, FRUIT, OR THE LIKE.
(Application filed July 3, 1899.)
(No Model.) 3 Sheets—Sheet 1.
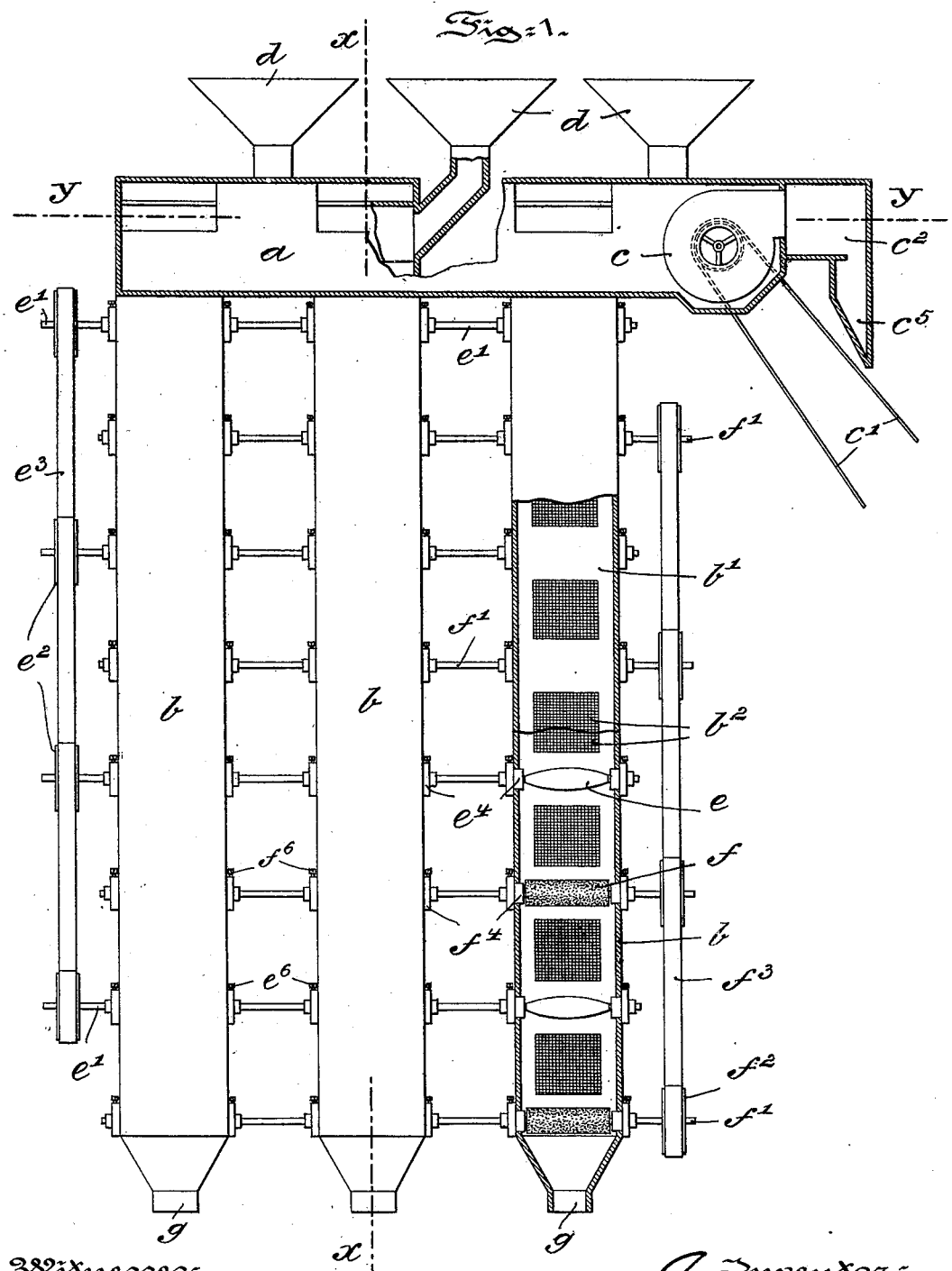

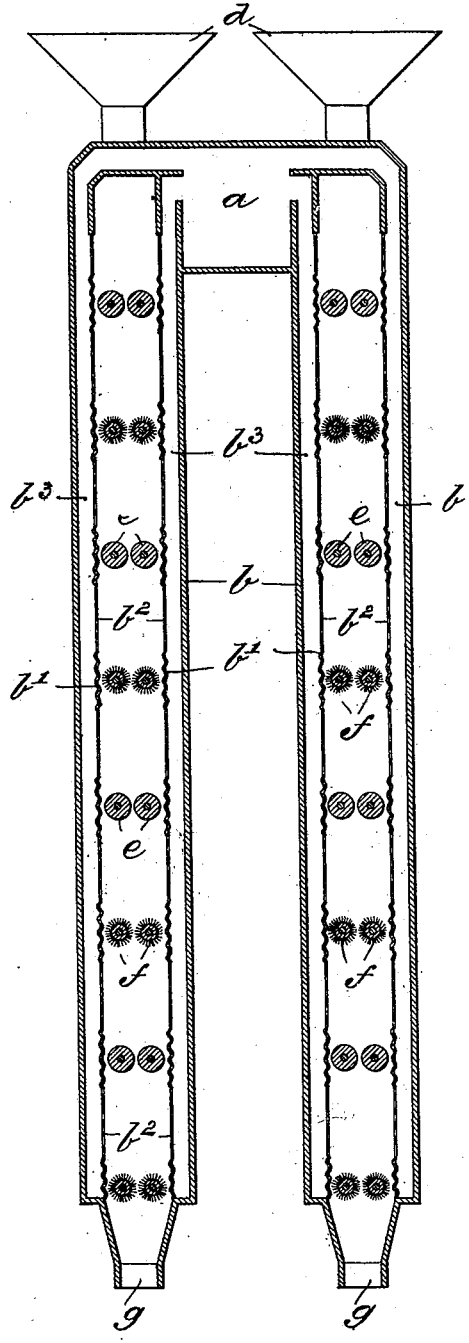
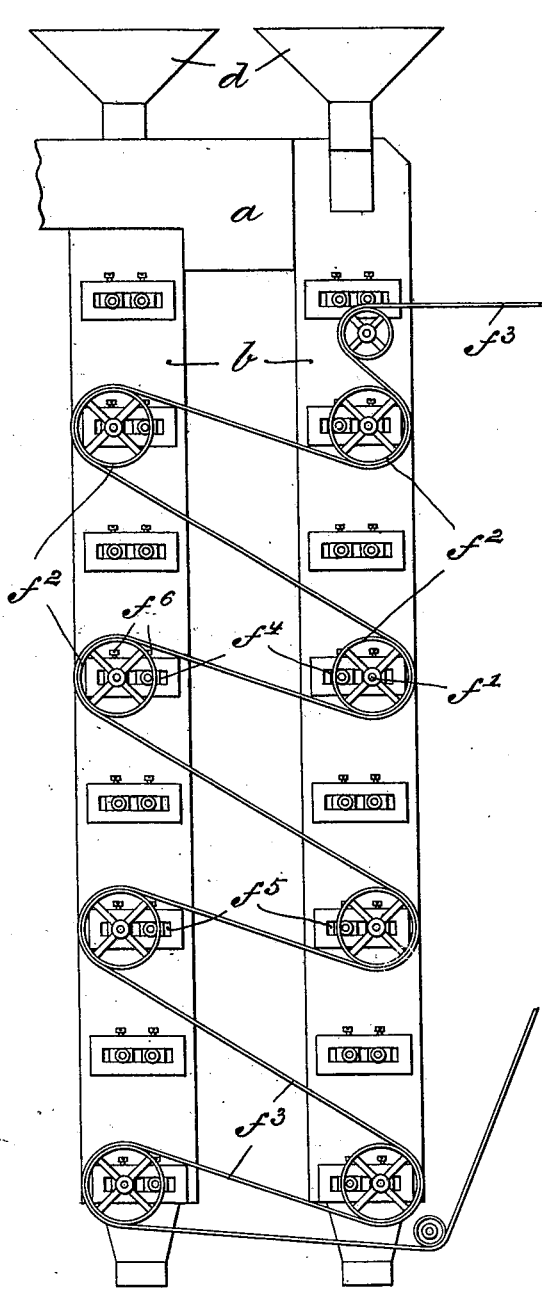

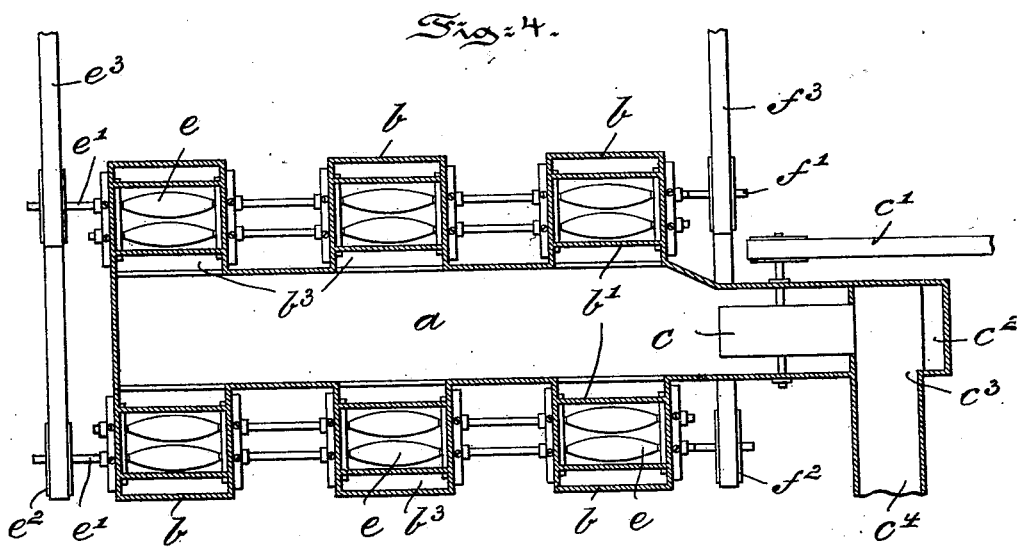
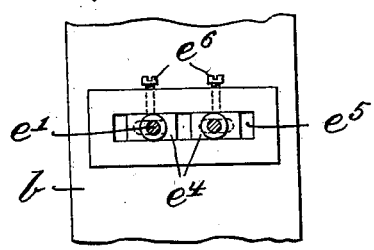
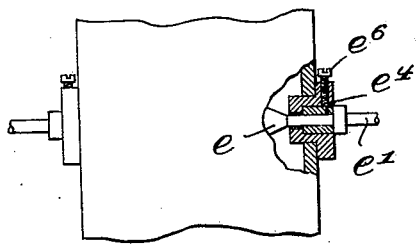
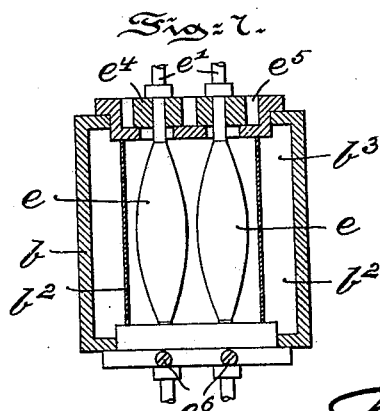

UNITED STATES PATENT OFFICE.

JOHN S. DETWILER, OF PHILADELPHIA, PENNSYLVANIA.

CLEANING, SCOURING, AND POLISHING MACHINE FOR GRAIN, FRUIT, OR THE LIKE.

SPECIFICATION forming part of Letters Patent No. 646,550, dated April 3, 1900.

Application filed July 3, 1899. Serial No. 722,621. (No model.)

*To all whom it may concern:*

Be it known that I, JOHN S. DETWILER, a citizen of the United States, residing at the city of Philadelphia, in the county of Philadelphia and State of Pennsylvania, have invented certain new and useful Improvements in Cleaning, Scouring, and Polishing Machines for Grain, Fruit, or the Like, of which the following is a specification.

My invention has relation to a machine for cleaning, scouring, and polishing grain, fruit, and the like, and in such connection it relates more particularly to the construction and arrangement of such a machine.

The principal object of my invention is to provide a machine of simple construction which shall rapidly and efficiently clean, scour, and polish the grain or fruit, removing all impurities, such as crease-dirt and fuzz, therefrom and delivering it in condition for further use.

To this end my invention consists, essentially, of a machine comprising one or more vertically-arranged legs or compartments, into the upper end of which the grain or fruit is fed and through which the grain or fruit travels by gravity, in combination with a series of transversely-arranged rollers and revolving brushes and means for exhausting from each leg or compartment the refuse removed by the rollers and brushes.

My invention further consists of a machine for the purposes specified when constructed and arranged in substantially the manner hereinafter described and claimed.

The nature and scope of my invention will be more fully understood from the following description, taken in connection with the accompanying drawings, forming part hereof, in which—

Figure 1 is a side elevational view, partly in section, of a machine embodying main features of my invention. Fig. 2 is an end elevational view thereof. Fig. 3 is a vertical transverse sectional view on the line $x\ x$ of Fig. 1. Fig. 4 is a horizontal sectional view on the line $y\ y$ of Fig. 1, and Figs. 5, 6, and 7 are enlarged detail views illustrating the arrangement and construction of the scouring-rolls and the means for adjusting the same.

Referring to the drawings, the machine comprises, essentially, an upper horizontally-arranged chamber $a$, connected to the upper end of a series of depending vertically-arranged legs or compartments $b$. The framework of the chamber $a$ and legs or compartments $b$ may be of wood, metal, or other suitable material. The horizontally-arranged chamber $a$ is provided at one end with an exhaust-fan $c$, connected by belting $c'$ with the driving-shaft (not shown) of the machine. Located in the rear of the exhaust-fan $c$ is a chamber $c^2$ for the reception of the chaff and heavier dirt, the chaff escaping through an opening $c^3$ to a duct $c^4$, while the heavier dirt falls into a chute or hopper $c^5$, from which it may be readily removed from time to time. Above the exhaust-chamber $a$ a series of hoppers $d$ is arranged, there being, preferably, one hopper for each leg or compartment $b$. Each leg or compartment $b$ consists of an outer casing, within which is arranged a second casing $b'$, of sheet metal or similar material, having in each of its side walls a series of screens $b^2$ and separated from the outer casing by ducts or channels $b^3$. At intervals between these screens $b^2$ is arranged a series of transverse rollers $e$ and brushes $f$. The rollers $e$ are arranged in pairs and are substantially elliptical in longitudinal section. One roller in each pair is provided with a shaft $e'$, extending outside the outer casing of the leg or compartment and provided at one end with a pulley $e^2$. The pulleys $e^2$ of all the shafts $e'$ are driven by a belt $e^3$, arranged on one side of the machine, as illustrated in Fig. 1. One brush $f$ of each pair is likewise provided with a shaft $f'$, extending outside the leg or compartment $b$ and provided at one end with a pulley $f^2$, and these pulleys $f^2$ are driven by a belt $f^3$, preferably arranged on that side of the machine opposite to that on which the pulleys $e^2$ of the rollers $e$ are arranged, as illustrated in Figs. 1 and 2. As shown in Fig. 3, the rollers $e$ and brushes $f$ alternate—that is to say, a pair of rollers $e$ will first act upon the grain or fruit as it leaves a hopper $d$ and then successively the brushes, rollers, &c., will act until the grain or fruit is discharged through a chute $g$ at the bottom of each leg or compartment. Although preferably but one roller or brush of each pair is positively driven, it is manifest that by means of suitable gearing (not shown) each roller or brush may be driven. It is found in practice, however, that the grain or fruit wedging between the rollers and the brushes will furnish sufficient frictional contact to transmit to the idle brush or roller the necessary motion from the driven brush or roller and will thus cause both to revolve and force the grain or fruit through the leg or compartment. The screens $b^2$ permit of a communication between the interior of the casing $b'$ and the ducts $b^3$, and inasmuch as these ducts $b^3$ enter directly into the exhaust-chamber $a$ all refuse scoured or brushed from the grain or fruit will be exhausted through the screens from the interior of the inner casing $b'$. The shafts of the respective rollers $e$ and $f$ are preferably mounted in bearings $e^4$ and $f^4$, movable in slots $e^5$ or $f^5$ in the sides of the legs or compartments $b$, as illustrated in Figs. 4, 5, and 6. By moving these bearings in their respective slots the rollers or brushes in each set may be moved toward or away from each other to thus adjust them for varying sizes of grain or fruit. Set-screws $e^6$ or $f^6$ serve to lock the bearings $e^4$ or $f^4$ in the slots $e^5$ or $f^5$ when the bearings have been so adjusted.

The operation of the machine is as follows: The grain or fruit is introduced into the hoppers $d$, from which it is conducted to a leg or legs $b$, passing directly into the interior casing of each leg or compartment. The grain or fruit is first presented, preferably, to a pair of rollers $e$ and is caused to pass through the same during the revolution of said rollers. The grain or fruit is thus rubbed or scoured and then presented to a set of brushes, which assist in the removal of the scoured material, as well as the crease-dirt. These operations are repeated as the material passes through successive pairs of rollers and brushes until it finally reaches the chute $g$ and emerges in a thoroughly rubbed, scoured, cleansed, and polished condition without being broken or otherwise injured. The refuse material is drawn from the interior casing, through the screens $b^2$, into the ducts $b^3$ and exhaust-chamber $a$ and is then delivered to the duct $c^3$ or to the hopper $c^5$, as heretofore explained.

Having thus described the nature and object of my invention, what I claim as new, and desire to secure by Letters Patent, is—

1. In a machine of the character described, a leg or compartment arranged vertically and in communication at its upper end with an exhaust-chamber, and a series of alternately-arranged pairs of rollers and brushes located transversely in the leg or compartment intermediate of its ends, substantially as and for the purposes described.

2. In a machine of the character described, a leg or compartment arranged vertically and depending from an exhaust-chamber, an interior casing within the leg or compartment and separated therefrom by a suitable duct or ducts leading directly to the exhaust-chamber, a series of alternately-arranged pairs of rollers and brushes located transversely within the interior casing and intermediate of the ends thereof, and a series of screens formed in the sides of the casing between the rollers and brushes, substantially as and for the purposes described.

3. In a grain cleaning and scouring machine, the combination of a series of vertical legs or compartments, a series of polishing-rollers and a series of brushes arranged in pairs alternately and at intervals in said legs or compartments, an air-duct provided in each leg or compartment, and an exhaust-chamber communicating with each of the air-ducts, substantially as described and for the purpose stated.

4. In a grain cleaning and scouring machine, the combination of the vertical legs or compartments, casings arranged within said legs or compartments, air-ducts formed between the casings and the legs or compartments, an exhaust-chamber in communication with the upper ends of said ducts, means provided in said exhaust-chamber for producing a suction, a series of alternate rollers and brushes located in the central grain leg or compartment, and a series of screens between the air-ducts and the said central leg or compartment, substantially as and for the purposes described.

5. In a grain cleaning and scouring machine, the combination of a series of vertically-disposed rectangular legs or compartments, an inner casing provided in each of said legs or compartments, rollers arranged in pairs and adjustable toward and from each other, brushes arranged in pairs and adjustable toward and from each other, air-ducts on each side of the casing, screens in said casing between each set of rolls and brushes, an exhaust-chamber located at the top of the legs or compartments into which the air-ducts open, and a fan provided in one end of said exhaust-chamber, substantially as described.

6. The combination of a vertical leg or compartment having air-ducts provided on each side thereof, a series of rollers arranged in pairs and having conical ends, means for adjusting said rollers toward and from each other, means for revolving said rollers of each pair in opposite directions so as to feed the grain between them, a series of brushes arranged in pairs and means for rotating the brushes of each pair in opposite directions, said pairs of rollers and brushes alternating with each other, means for adjusting said brushes laterally and screens arranged between the leg or compartment and the air-ducts, substantially as and for the purposes described.

In testimony whereof I have hereunto set my signature in the presence of two subscribing witnesses.

JNO. S. DETWILER.

Witnesses:
 J. WALTER DOUGLASS,
 THOMAS M. SMITH.